(12) United States Patent
Kossmann et al.

(10) Patent No.: US 10,611,582 B2
(45) Date of Patent: Apr. 7, 2020

(54) STACKING DEVICE FOR STACKING PAINT AND ASSEMBLY PLUGS

(71) Applicant: Bayerische Motoren Werke Aktiengesellschaft, Munich (DE)

(72) Inventors: Max Kossmann, Munich (DE); Ralf Schoenherr, Haar (DE); Ingo Schmiedel, Altomuenster / Asbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/846,925

(22) Filed: Dec. 19, 2017

(65) Prior Publication Data
US 2018/0105372 A1   Apr. 19, 2018

Related U.S. Application Data

(63) Continuation of application No. PCT/EP2016/067197, filed on Jul. 19, 2016.

(30) Foreign Application Priority Data

Sep. 9, 2015   (DE) .......................... 10 2015 217 208

(51) Int. Cl.
*B65G 57/03*   (2006.01)
*B25H 3/00*    (2006.01)
(Continued)

(52) U.S. Cl.
CPC ............. *B65G 57/03* (2013.01); *B25H 3/006* (2013.01); *B65G 57/20* (2013.01); *B05B 12/26* (2018.02); *B65G 1/02* (2013.01); *B65G 2201/02* (2013.01)

(58) Field of Classification Search
CPC ........ B65G 57/00; B65G 57/02; B65G 57/03; B65G 57/08; B65G 57/16
See application file for complete search history.

(56) References Cited

U.S. PATENT DOCUMENTS 1,930,321 A * 10/1933 Ogden ..................... A47F 1/08
                                                          312/42
4,160,504 A    7/1979 Kudlich et al.
(Continued)

FOREIGN PATENT DOCUMENTS

CN    204601532 U    9/2015
DE    36 19 519 C1   7/1987
(Continued)

OTHER PUBLICATIONS

German Search Report issued in counterpart German Application No. 10 2015 217 208.2 dated Aug. 17, 2016 with partial English-language translation (Fifteen (15) pages).
(Continued)

*Primary Examiner* — Steven A. Reynolds
*Assistant Examiner* — Javier A Pagan
(74) *Attorney, Agent, or Firm* — Crowell & Moring LLP

(57) ABSTRACT

A stacking device is provided for stacking plugs, in particular paint or installation plugs for motor vehicles, having a housing which has an opening, at at least one axial end, on a front side and in which extend in the axial direction, on an inner wall of the housing, at least two retaining and guide devices for the plugs. The retaining and guiding devices are designed to keep the plugs stacked in position, to allow axial movement of the plugs, and to guide the plugs in the axial direction.

11 Claims, 2 Drawing Sheets

(51) Int. Cl.
    *B65G 57/20*    (2006.01)
    *B05B 12/26*    (2018.01)
    *B65G 1/02*    (2006.01)

(56) References Cited

U.S. PATENT DOCUMENTS

| | | | |
|---|---|---|---|
| 2012/0283051 A1* | 11/2012 | Belete | A63B 67/066 473/473 |
| 2014/0259671 A1* | 9/2014 | Stoeckmann | A44C 27/00 29/896.41 |
| 2015/0197393 A1* | 7/2015 | Braun | B65D 25/10 206/497 |

FOREIGN PATENT DOCUMENTS

| | | |
|---|---|---|
| DE | 10 2012 013 590 A1 | 1/2014 |
| DE | 20 2014 005 960 U1 | 10/2014 |
| DE | 11 2012 007 007 T5 | 7/2015 |

OTHER PUBLICATIONS

International Search Report (PCT/ISA/210) issued in PCT Application No. PCT/EP2016/067197 dated Oct. 17, 2016 with English-language translation (Seven(7) pages).

German-language Written Opinion (PCT/ISA/237) issued in PCT/EP2016/067197 dated Oct. 17, 2016 (Five (5) pages).

Chinese-language Office Action issued in counterpart Chinese Application No. 201680029584.2 dated Oct. 31, 2018 with English translation (14 pages).

Chinese-language Office Action issued in counterpart Chinese Application No. 201680029584.2 dated Oct. 31, 2018 with English translation (11 pages).

Chinese-language Office Action issued in counterpart Chinese Application No. 201680029584.2 dated Jun. 28, 2019 with English translation (11 pages).

Chinese-language Rejection Decision issued in counterpart Chinese Application No. 201680029584.2 dated Nov. 29, 2019 with English translation (11 pages).

* cited by examiner

STACKING DEVICE FOR STACKING PAINT AND ASSEMBLY PLUGS

CROSS REFERENCE TO RELATED APPLICATIONS

This application is a continuation of PCT International Application No. PCT/EP2016/067197, filed Jul. 19, 2016, which claims priority under 35 U.S.C. § 119 from German Patent Application No. 10 2015 217 208.2, filed Sep. 9, 2015, the entire disclosures of which are herein expressly incorporated by reference.

BACKGROUND AND SUMMARY OF THE INVENTION

The invention relates to a stacking device for stacking plugs, in particular paint or assembly plugs for motor vehicles, and to a system consisting of a stacking device and a plug holding device.

In order to ensure that, in the case of vehicle body components, after painting, the liquid paint can flow away quickly again from the cavities, said cavities are provided with numerous, in some cases up to several hundred, openings. Holes also have to be provided for setting welding spots. In addition, wax can be injected through these openings into the cavities in order to seal the vehicle body component. All the openings must be closed again during assembly to prevent the ingress of moisture or water and to protect the vehicle from corrosion during operation. The openings are closed with so-called plugs of hard plastic which are available in different diameters.

The plugs are usually round and have a head, which covers a hole, and a fastening device which is situated radially further to the inside and which is guided through the hole and engages behind edge portions of the hole in a fastening manner.

In order to set the plugs, there are tools having a plug magazine into which plugs arranged axially in a row are inserted. To avoid the plugs having to be fed individually to the tool, prestacking of the plugs is desirable. However, automating the stacking of the plugs is cost-intensive and susceptible to error. Moreover, a separate process would have to be developed for each plug design.

An object on which the invention is based is therefore to provide a stacking device for the simplified stacking for plugs, from which device the tool magazine can be filled. In addition, it is an object of the invention to provide a system by means of which the stacking device can be simply filled with plugs until a plug stack with a predefined number of plugs is formed.

These objects are achieved by a stacking device and system in accordance with embodiments of the invention.

According to the invention, there is proposed a stacking device for plugs, in particular paint or assembly plugs for motor vehicles, having a housing which has an opening, at at least one axial end, on a front side and in which extend in the axial direction, on an inner wall of the housing, at least two holding and guiding devices for the plugs, these being designed to hold the plugs stacked in position, to allow an axial movement of the plugs and to guide them in the axial direction.

The plugs can be stacked with and in the stacking device, with the plugs being able to be fed into the interior of the housing via the opening on the front side. The tool for plug setting can be moved into the opening and remove the stacked plugs and feed them to its magazine. The tool is guided by robot or manually. The holding and guiding devices ensure a stack of mutually aligned plugs in an axial line, which plugs can be transferred from the stacking device directly into the tool magazine.

The holding and guiding devices for the plugs are preferably elastic, with the result that the plugs find an engagement therein. In a preferred embodiment variant, there is provision that the holding and guiding devices are formed from foam.

Also advantageous is an embodiment in which the stacking device is characterized in that in total four holding and guiding devices are provided, of which in each case two are arranged opposite one another. As a result, the plugs are sufficiently secured against unwanted axial slipping and guided in a stable manner.

In an advantageous embodiment, there is provision that the housing has an octagonal cross section. This offers the advantage of good packability in standard packs and also surfaces for the holding and guiding devices that in each case face one another.

In the stacking device according to the invention, an embodiment is advantageous in which the holding and guiding devices have a triangular or oval cross section and extend substantially over the entire axial length of the housing. Here, it is advantageous if a tip of the triangular cross section of the respective holding and guiding device points in each case in the direction of an axial center line of the stacking device. In the case of the holding and guiding device, both functions, namely holding and guiding of the plugs, must be ensured. The triangle tips pointing to the center line offer good displaceability by the plugs and thus make it possible for the plugs to slide easily in the axial direction. At the same time, the plugs are wedged sufficiently firmly that they do not fall out of the housing.

In an exemplary embodiment of the invention, there is additionally provision that the opening is formed in a square plate which is fastened to an axial end of the housing. The plate offers a secure footing for the stacking device and projects beyond radial edge portions of the housing.

To fasten the holding and guiding devices, there is provision, in a cost-effective and stable design, that the opening is provided at its peripheral edge with notches through which the holding and guiding devices can be inserted and/or in which the respective holding and guiding device is held. In addition, the holding and guiding devices can be adhesively bonded in the housing or fixed by way of a tongue and groove connection.

In a further exemplary embodiment of the stacking device, a plate having a respective opening on the front side is provided at both axial ends of the housing.

A constituent part of the invention is also a system for stacking plugs, in particular the paint or assembly plugs for motor vehicles, consisting of an above-described stacking device and a plug holding device. The plug holding device has a projecting portion on which at least one plug can be placed unfastened. The at least one opening can be fitted over the projecting portion with the plug placed thereon and said portion can be inserted with the plug in the axial direction into an interior of the housing of the stacking device. The plug or plugs is or are held by the holding and guiding devices situated in the interior of the housing while the stacking device is moved away from the plug holding device. After completion of the fitting-over and the moving-away of the stacking device, a new plug is placed on the plug holding device and the stacking device is fitted over again. This step is repeated multiple times. The housing thus fills gradually with plugs in an axial row. Here, the holding and guiding devices prevents the plugs from falling out of the stacking device. In addition, the plugs are guided in the axial direction and are each situated parallel to one another within the housing.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference signs designate identical parts in all views.

DETAILED DESCRIPTION OF THE DRAWINGS

Figure 1:
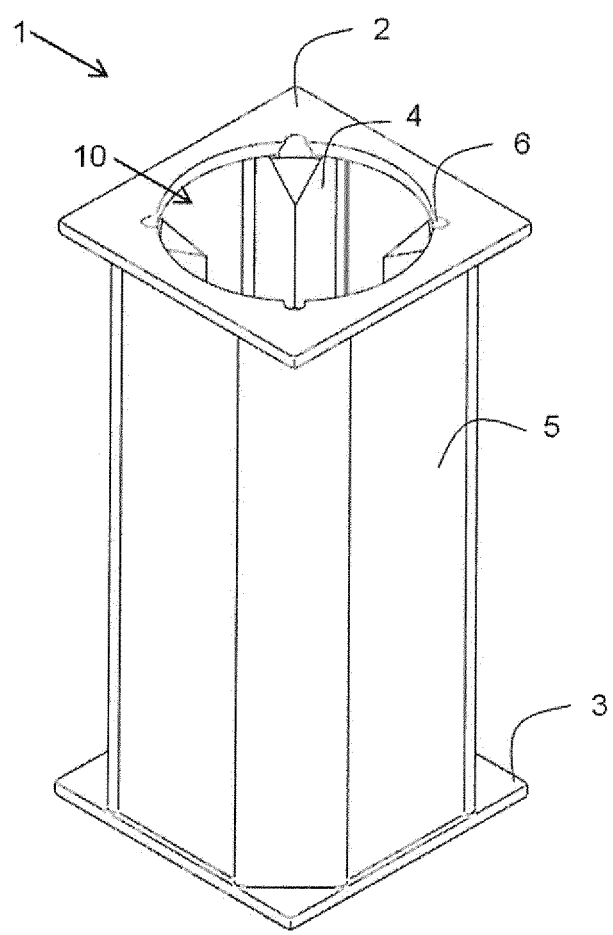
FIG. 1 is a perspective view of the stacking device according to an embodiment of the invention.
Figure 2:
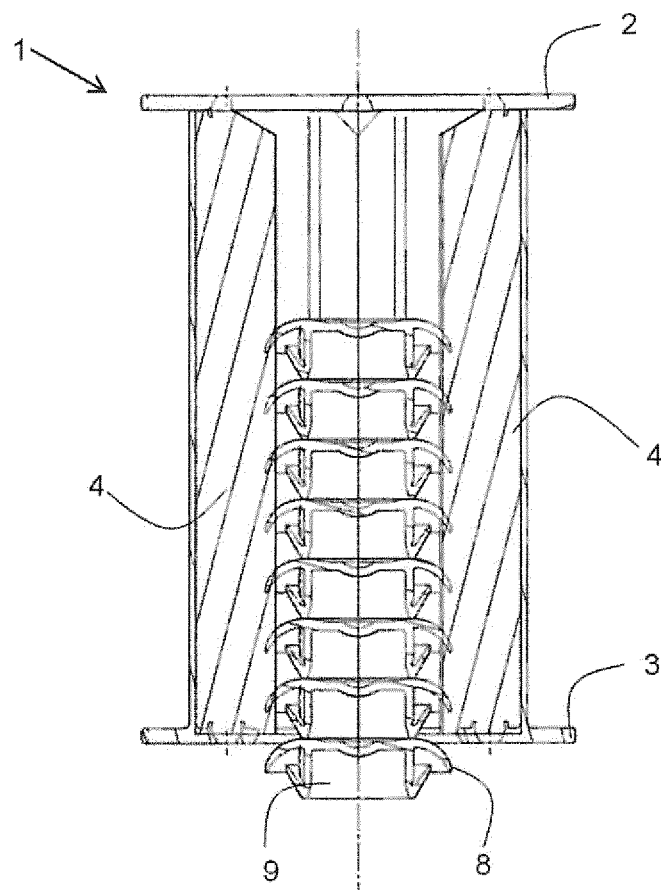
FIG. 2 is a sectional view of the stacking device from FIG. 1.

FIG. 1 illustrates an exemplary embodiment of a stacking device 1 for plugs 9 in a perspective view, and FIG. 2 shows an associated lateral cross section. The stacking device 1 has an octagonal housing 5 at each of whose axial ends square plates 2, 3 are provided. The plates 2, 3 can be formed integrally on the housing 5 or be fastened thereto as additional components. Both plates 2, 3 have, on their outwardly directed front side, a respective opening 10 which is larger in diameter than the plugs 9. Extending continuously in the axial direction on the inner wall of the housing 5 are four cross-sectionally triangular holding and guiding devices 4 which are formed from foam and which hold the plugs 9 stacked in position, but at the same time allow an axial movement of the plugs 9 and guide them in the axial direction during their axial movement both in the course of filling and removal. The plugs 9 have a head 8 by means of which they engage in the holding and guiding devices 4. The holding and guiding devices 4 extend over the entire axial length of the housing 5 and point by way of their triangle tips toward the axial center line of the stacking device 1. The holding and guiding devices 4 are beveled in the region of the opening 10 in the plate 2. Notches 6 are punched in the peripheral edge of the opening 10 for each holding and guiding device 4, via which notches the holding and guiding devices 4 can be inserted into the housing 5 and can also be held thereon.

FIG. 2 shows a plug 9 still outside the stacking device 1. The latter is guided vertically downward to press the plug 9 into the interior of the housing 5 and to increase the plug stack to eight plugs 9. The next plug (not shown) is then pressed in. The process is repeated until the desired number of plugs is achieved. For easier handling, the plug 9 to be pressed in is placed on a plug holding device (not shown) which has a portion which projects in the vertical direction. The stacking device 1, in particular the opening 10, can be fitted over the projecting portion with the plug 9 placed thereon, with the result that the plug 9 is pressed in the axial direction into the interior of the housing 5. A plug holding device can additionally have means for aligning the position of the plug 9 with respect to the stacking device 1, with the result that the position relative to one another is clearly determined and the plug 9 is always pressed in the same position into the stacking device 1. As a result, the plugs 9 lie exactly in an axial line.

Figure 3:
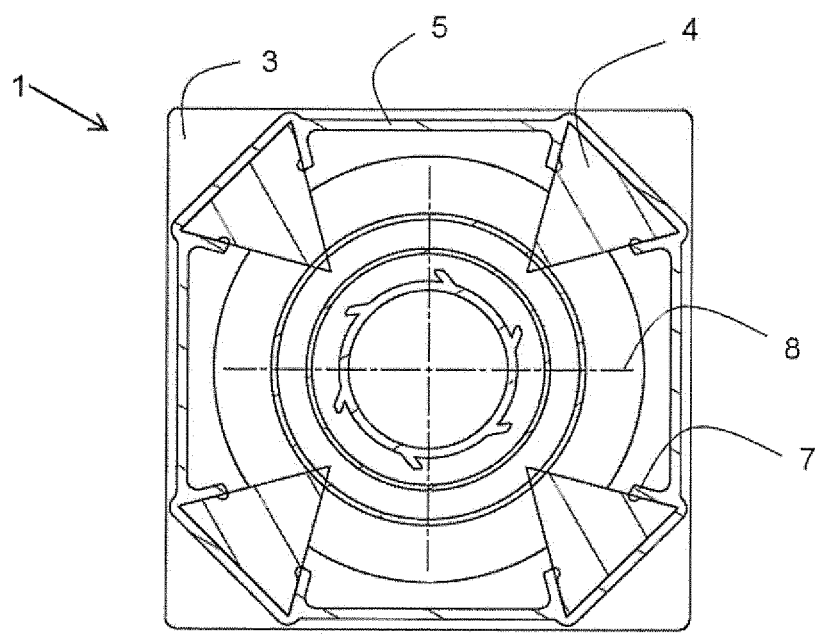
FIG. 3 is a view of the stacking device from FIG. 1 from below.

FIG. 3 shows the stacking device 1 from FIG. 2 in a view from below. In each case two hook elements 7 are integrally formed on the housing 5 for each holding and guiding device 4, said hook elements engaging in the holding and guiding device 4 and fastening it to the housing 5. The hook elements 7 have webs which extend substantially toward the axial center line of the stacking device 1 and which have edge portions which hook at their end into the respective holding and guiding device 4.

In order to extract the plug stack, the tool moves into the opening 10, displaces the holding and guiding devices 4, grips the plug stack, and pulls it out.

The invention is not restricted in its execution to the above-stated preferred exemplary embodiments. On the contrary, a number of variants are conceivable which make use of the illustrated solution even in fundamentally different types of embodiments. For example, it is also possible for other than the stated forms for the holding and guiding devices to be used or for different forms to be mixed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A stacking device for plugs associated with motor vehicles, comprising:
a housing having an opening at least one axial end on a front side thereof;
a plate having a respective opening on the front side is provided at both axial ends of the housing;
plugs associated with motor vehicles;
at least two holding and guiding devices configured to hold and guide the plugs associated with motor vehicles, the at least two holding and guiding devices extending in an axial direction of the housing on an inner wall of the housing, wherein
the at least two holding and guiding devices are configured to hold the plugs associated with motor vehicles stacked in position, to allow an axial movement of the plugs associated with motor vehicles, and to guide the plugs associated with motor vehicles in the axial direction.

2. The stacking device for plugs associated with motor vehicles according to claim 1, wherein the plugs associated with motor vehicles are paint or assembly plugs for motor vehicles.

3. The stacking device for plugs associated with motor vehicles according to claim 1, wherein the housing has an octagonal cross section.

4. The stacking device for plugs associated with motor vehicles according to claim 1, wherein only four holding and guiding devices are provided, of which in each case two are arranged opposite one another on the inner wall of the housing.

5. The stacking device for plugs associated with motor vehicles according to claim 1, wherein the holding and guiding devices are formed from foam.

6. The stacking device for plugs associated with motor vehicles according to claim 1, wherein the holding and guiding devices have a triangular or oval cross section and extend substantially over an entire axial length of the housing.

7. The stacking device for plugs associated with motor vehicles according to claim 6, wherein a tip of the triangular cross section of a respective holding and guiding device points in each case in a direction of an axial center line of the stacking device.

8. The stacking device for plugs associated with motor vehicles according to claim 1, wherein the opening is formed in a square plate which is fastened to the at least one axial end of the housing.

9. The stacking device for plugs associated with motor vehicles according to claim 1, wherein notches are provided at an inner peripheral edge of the plate, the notches holding the respective holding and guiding devices in place.

10. The stacking device for plugs associated with motor vehicles according to claim 1, further comprising notches that are formed on the plate, the notches being positioned to coincide, along a radial direction of the plate, with a location of the at least two holding and guiding devices.

11. A system for stacking plugs associated with motor vehicles, the system comprising:
   a stacking device according to claim 1; and
   a plug holding device having a projecting portion on which at least one plug is placable in an unfastened manner, wherein
      the opening of the housing is fitted over the projecting portion of the plug holding device with the plug placed thereon and said projecting portion being insertable with the plug in the axial direction into an interior of the housing, and
      the plug is held via the holding and guiding devices in the interior of the housing while the stacking device is moved away from the plug holding device.

* * * * *